United States Patent
Van Stam

(10) Patent No.: US 10,440,342 B2
(45) Date of Patent: Oct. 8, 2019

(54) SECURE TRANSFER OF PREVIOUSLY BROADCASTED CONTENT

(71) Applicant: TiVo Solutions Inc., San Carlos, CA (US)

(72) Inventor: Wijnand Van Stam, Sunnyvale, CA (US)

(73) Assignee: TiVo Solutions Inc., San Jose, CA (US)

( * ) Notice: Subject to any disclaimer, the term of this patent is extended or adjusted under 35 U.S.C. 154(b) by 310 days.

(21) Appl. No.: 15/018,856

(22) Filed: Feb. 8, 2016

(65) Prior Publication Data
US 2016/0191988 A1    Jun. 30, 2016

Related U.S. Application Data

(63) Continuation of application No. 11/285,411, filed on Nov. 21, 2005, now Pat. No. 9,258,592.

(Continued)

(51) Int. Cl.
*H04N 7/173* (2011.01)
*H04N 9/804* (2006.01)
(Continued)

(52) U.S. Cl.
CPC ......... *H04N 9/8042* (2013.01); *G06F 3/0481* (2013.01); *G06F 3/04817* (2013.01); *G11B 27/32* (2013.01); *H04N 1/2112* (2013.01); *H04N 5/76* (2013.01); *H04N 5/765* (2013.01); *H04N 5/85* (2013.01); *H04N 5/913* (2013.01);
(Continued)

(58) Field of Classification Search
CPC ............... H04N 21/21; H04N 21/2393; H04N 21/2543; H04N 21/25816; H04N 21/4104; H04N 21/4122; H04N 21/4135; H04N 21/41407; H04N 21/4143; H04N 21/4147; H04N 21/4227; H04N 21/4312; H04N 21/4314; H04N 21/4331; H04N 21/4334; H04N 21/43622; H04N 21/4367; H04N 21/440236; H04N 21/4405; H04N 21/4408; H04N 21/44204; H04N 21/454; H04N 21/472; H04N 21/4722; H04N 21/47815; H04N 21/4788; H04N 21/482;
(Continued)

(56) References Cited

U.S. PATENT DOCUMENTS

| 4,488,179 A | 12/1984 | Krüger et al. |
| 4,697,209 A | 9/1987 | Kiewit et al. |

(Continued)

FOREIGN PATENT DOCUMENTS

| EP | 078440 | 7/1997 |
| EP | 0933891 | 8/1999 |

(Continued)

OTHER PUBLICATIONS

Chinese Patent Office, Application No. 200410039972.8, Claims dated Nov. 2005, 9 pages.

(Continued)

*Primary Examiner* — John R Schnurr
(74) *Attorney, Agent, or Firm* — Haley Guiliano LLP

(57) ABSTRACT

A method and apparatus for secure transfer of previously broadcasted content enables the secure transfer of previously broadcasted content between DVRs on a computer network.

12 Claims, 9 Drawing Sheets

Related U.S. Application Data

(60) Provisional application No. 60/630,398, filed on Nov. 19, 2004.

(51) Int. Cl.

| | |
|---|---|
| *G06F 3/0481* | (2013.01) |
| *G11B 27/32* | (2006.01) |
| *H04N 5/76* | (2006.01) |
| *H04N 5/765* | (2006.01) |
| *H04N 5/85* | (2006.01) |
| *H04N 5/913* | (2006.01) |
| *H04N 21/239* | (2011.01) |
| *H04N 21/2543* | (2011.01) |
| *H04N 21/258* | (2011.01) |
| *H04N 21/41* | (2011.01) |
| *H04N 21/414* | (2011.01) |
| *H04N 21/4143* | (2011.01) |
| *H04N 21/4147* | (2011.01) |
| *H04N 21/4227* | (2011.01) |
| *H04N 21/431* | (2011.01) |
| *H04N 21/433* | (2011.01) |
| *H04N 21/436* | (2011.01) |
| *H04N 21/4367* | (2011.01) |
| *H04N 21/4402* | (2011.01) |
| *H04N 21/4405* | (2011.01) |
| *H04N 21/4408* | (2011.01) |
| *H04N 21/442* | (2011.01) |
| *H04N 21/454* | (2011.01) |
| *H04N 21/4722* | (2011.01) |
| *H04N 21/478* | (2011.01) |
| *H04N 21/4788* | (2011.01) |
| *H04N 21/63* | (2011.01) |
| *H04N 21/6543* | (2011.01) |
| *H04N 21/81* | (2011.01) |
| *H04N 21/858* | (2011.01) |
| *H04N 21/21* | (2011.01) |
| *H04N 21/472* | (2011.01) |
| *H04N 21/482* | (2011.01) |
| *H04N 21/61* | (2011.01) |
| *H04N 1/21* | (2006.01) |
| *H04N 5/775* | (2006.01) |
| *H04N 5/781* | (2006.01) |
| *H04N 7/088* | (2006.01) |
| *H04N 9/82* | (2006.01) |
| *H04N 5/95* | (2006.01) |
| *H04N 9/83* | (2006.01) |

(52) U.S. Cl.
CPC ......... *H04N 7/173* (2013.01); *H04N 7/17309* (2013.01); *H04N 7/17318* (2013.01); *H04N 21/21* (2013.01); *H04N 21/2393* (2013.01); *H04N 21/2543* (2013.01); *H04N 21/25816* (2013.01); *H04N 21/4104* (2013.01); *H04N 21/4122* (2013.01); *H04N 21/4135* (2013.01); *H04N 21/4143* (2013.01); *H04N 21/4147* (2013.01); *H04N 21/41407* (2013.01); *H04N 21/4227* (2013.01); *H04N 21/4312* (2013.01); *H04N 21/4314* (2013.01); *H04N 21/4331* (2013.01); *H04N 21/4334* (2013.01); *H04N 21/4367* (2013.01); *H04N 21/43615* (2013.01); *H04N 21/43622* (2013.01); *H04N 21/4405* (2013.01); *H04N 21/4408* (2013.01); *H04N 21/44204* (2013.01); *H04N 21/440236* (2013.01); *H04N 21/454* (2013.01); *H04N 21/472* (2013.01); *H04N 21/4722* (2013.01); *H04N 21/4788* (2013.01); *H04N 21/47815* (2013.01); *H04N 21/482* (2013.01); *H04N 21/6175* (2013.01); *H04N 21/632* (2013.01); *H04N 21/6543* (2013.01); *H04N 21/812* (2013.01); *H04N 21/858* (2013.01); *H04N 5/775* (2013.01); *H04N 5/7755* (2013.01); *H04N 5/781* (2013.01); *H04N 5/95* (2013.01); *H04N 7/088* (2013.01); *H04N 9/8205* (2013.01); *H04N 9/83* (2013.01); *H04N 21/478* (2013.01); *H04N 2005/91335* (2013.01); *H04N 2005/91364* (2013.01)

(58) Field of Classification Search
CPC .............. H04N 21/6175; H04N 21/632; H04N 21/6543; H04N 21/812; H04N 21/858
See application file for complete search history.

(56) References Cited

U.S. PATENT DOCUMENTS

| | | |
|---|---|---|
| 4,908,707 A | 3/1990 | Kinghorn |
| 4,930,158 A | 5/1990 | Vogel |
| 4,931,865 A | 6/1990 | Scarampi |
| 5,014,125 A | 5/1991 | Pocock et al. |
| 5,034,902 A | 7/1991 | Steinmann |
| 5,057,932 A | 10/1991 | Lang |
| 5,113,294 A | 5/1992 | Kim |
| 5,134,499 A | 7/1992 | Sata et al. |
| 5,282,247 A | 1/1994 | McLean et al. |
| 5,307,173 A | 4/1994 | Yuen et al. |
| 5,363,481 A | 11/1994 | Tilt |
| 5,371,551 A | 12/1994 | Logan et al. |
| 5,371,794 A | 12/1994 | Diffie et al. |
| 5,375,160 A | 12/1994 | Guidon et al. |
| 5,377,051 A | 12/1994 | Lane et al. |
| 5,414,455 A | 5/1995 | Hooper et al. |
| 5,469,207 A | 11/1995 | Chambers |
| 5,481,294 A | 1/1996 | Thomas et al. |
| 5,519,684 A | 5/1996 | Iizuka et al. |
| 5,519,780 A | 5/1996 | Woo et al. |
| 5,535,008 A | 7/1996 | Yamagishi et al. |
| 5,555,441 A | 9/1996 | Haddad |
| 5,559,653 A | 9/1996 | Shouji et al. |
| 5,574,662 A | 11/1996 | Windrem et al. |
| 5,578,068 A | 11/1996 | Laske et al. |
| 5,600,775 A | 2/1997 | King et al. |
| 5,631,743 A | 5/1997 | Inoue |
| 5,659,368 A | 8/1997 | Landis |
| 5,671,412 A | 9/1997 | Christiano |
| 5,696,866 A | 12/1997 | Iggulden et al. |
| 5,708,787 A | 1/1998 | Nakano et al. |
| 5,719,982 A | 2/1998 | Kawamura et al. |
| 5,721,933 A | 2/1998 | Walsh et al. |
| 5,742,768 A | 4/1998 | Gennaro et al. |
| 5,758,068 A | 5/1998 | Brandt et al. |
| 5,767,913 A | 6/1998 | Kassatly |
| 5,790,664 A | 8/1998 | Coley et al. |
| 5,805,763 A | 9/1998 | Lawler et al. |
| 5,808,702 A | 9/1998 | Yoshinobu et al. |
| 5,812,732 A | 9/1998 | Dettmer et al. |
| 5,872,588 A | 2/1999 | Aras et al. |
| 5,892,536 A | 4/1999 | Logan |
| 5,896,566 A | 4/1999 | Averbuch et al. |
| 5,911,029 A | 6/1999 | Sakaguchi et al. |
| 5,929,849 A | 7/1999 | Kikinis |
| 5,940,504 A | 8/1999 | Griswold |
| 5,957,695 A | 9/1999 | Redford et al. |
| 5,987,210 A | 11/1999 | Iggulden et al. |
| 5,987,509 A | 11/1999 | Portuesi |
| 5,990,881 A | 11/1999 | Inoue et al. |
| 5,990,884 A | 11/1999 | Douma et al. |
| 5,991,503 A | 11/1999 | Miyasaka et al. |
| 5,999,225 A | 12/1999 | Yagasaki et al. |
| 5,999,688 A | 12/1999 | Iggulden et al. |
| 5,999,691 A | 12/1999 | Takagi et al. |
| 6,009,525 A | 12/1999 | Horstmann |
| 6,018,775 A | 1/2000 | Vossler |

(56) References Cited

U.S. PATENT DOCUMENTS

| | | |
|---|---|---|
| 6,029,195 A | 2/2000 | Herz |
| 6,052,554 A | 4/2000 | Hendricks et al. |
| 6,057,901 A | 5/2000 | Xu |
| 6,058,430 A | 5/2000 | Kaplan |
| 6,072,393 A | 6/2000 | Todd |
| 6,072,982 A | 6/2000 | Haddad |
| 6,075,550 A | 6/2000 | Lapierre |
| 6,092,201 A | 7/2000 | Turnbull et al. |
| 6,094,234 A | 7/2000 | Nonomura et al. |
| 6,100,941 A | 8/2000 | Dimitrova et al. |
| 6,115,057 A | 9/2000 | Kwoh et al. |
| 6,148,140 A | 11/2000 | Okada et al. |
| 6,157,413 A | 12/2000 | Hanafee et al. |
| 6,166,730 A | 12/2000 | Goode et al. |
| 6,169,976 B1 | 1/2001 | Colosso |
| 6,172,605 B1 | 1/2001 | Matsumoto et al. |
| 6,216,231 B1 | 4/2001 | Stubblebine |
| 6,219,839 B1 | 4/2001 | Sampsell |
| 6,247,176 B1 | 6/2001 | Schein et al. |
| 6,249,863 B1 | 6/2001 | Redford et al. |
| 6,260,142 B1 | 7/2001 | Thakkar et al. |
| 6,262,951 B1 | 7/2001 | Shimizu et al. |
| 6,263,503 B1 | 7/2001 | Margulis |
| 6,269,099 B1 | 7/2001 | Borella et al. |
| 6,285,407 B1 | 9/2001 | Yasuki et al. |
| 6,289,169 B1 | 9/2001 | Okuyama |
| 6,295,093 B1 | 9/2001 | Park et al. |
| 6,311,011 B1 | 10/2001 | Kuroda |
| 6,349,410 B1 | 2/2002 | Lortz |
| 6,351,538 B1 | 2/2002 | Uz |
| 6,380,978 B1 | 4/2002 | Adams et al. |
| 6,404,977 B1 | 6/2002 | Iggulden |
| 6,412,111 B1 | 6/2002 | Cato |
| 6,442,328 B1 | 8/2002 | Elliott et al. |
| RE37,881 E | 10/2002 | Haines |
| 6,473,903 B2 | 10/2002 | Balakrishnan et al. |
| 6,480,353 B1 | 11/2002 | Sacks et al. |
| 6,480,667 B1 | 11/2002 | O'Connor |
| 6,496,981 B1 | 12/2002 | Wistendahl et al. |
| 6,526,581 B1 | 2/2003 | Edson |
| 6,535,465 B1 | 3/2003 | Shigetomi et al. |
| 6,564,996 B2 | 5/2003 | Hoffman et al. |
| 6,611,803 B1 | 8/2003 | Furuyama et al. |
| 6,614,987 B1 | 9/2003 | Ismail et al. |
| 6,637,032 B1 | 10/2003 | Feinleib |
| 6,694,200 B1 | 2/2004 | Naim |
| 6,751,321 B1 | 6/2004 | Kato et al. |
| 6,788,882 B1 | 9/2004 | Geer et al. |
| 6,832,388 B1 | 12/2004 | Du Val |
| 6,839,851 B1 | 1/2005 | Saitoh et al. |
| 6,895,166 B1 | 5/2005 | Schriebman |
| 6,898,762 B2 | 5/2005 | Ellis et al. |
| 6,909,837 B1 | 6/2005 | Unger |
| 6,931,531 B1 | 8/2005 | Takahashi |
| 6,941,387 B1 | 9/2005 | Takihara |
| 6,959,221 B1 | 10/2005 | Kataoka |
| 6,973,256 B1 | 12/2005 | Dagtas |
| 6,981,147 B1 | 12/2005 | Hamann et al. |
| 7,003,790 B1 | 2/2006 | Inoue et al. |
| 7,006,881 B1 | 2/2006 | Hoffberg et al. |
| 7,028,327 B1 | 4/2006 | Dougherty et al. |
| 7,055,166 B1 | 5/2006 | Logan et al. |
| 7,065,778 B1 | 6/2006 | Lu |
| 7,080,400 B1 | 7/2006 | Navar |
| 7,103,908 B2 | 9/2006 | Tomsen |
| 7,107,608 B2 | 9/2006 | Wagner et al. |
| 7,110,658 B1 | 9/2006 | Iggulden et al. |
| 7,140,033 B1 | 11/2006 | Durden et al. |
| 7,155,451 B1 | 12/2006 | Torres |
| 7,159,232 B1 | 1/2007 | Blackketter et al. |
| 7,188,087 B1 | 3/2007 | Goldstein |
| 7,194,754 B2 | 3/2007 | Tomsen et al. |
| 7,213,005 B2 | 5/2007 | Mourad et al. |
| 7,225,142 B1 | 5/2007 | Apte |
| 7,231,516 B1 | 6/2007 | Sparrell et al. |
| 7,260,715 B1 | 8/2007 | Pasieka |
| 7,269,330 B1 | 9/2007 | Iggulden |
| 7,308,698 B1 | 12/2007 | Heughebaert et al. |
| 7,313,802 B1 | 12/2007 | Tomsen |
| 7,333,153 B2 | 2/2008 | Hartson et al. |
| 7,373,651 B2 | 5/2008 | Palazzo et al. |
| 7,395,546 B1 | 7/2008 | Asmussen |
| 7,404,148 B2 | 7/2008 | Lincke et al. |
| 7,457,511 B2 | 11/2008 | Putterman et al. |
| 7,529,465 B2 | 5/2009 | Barton et al. |
| 7,661,121 B2 | 2/2010 | Smith |
| 7,681,141 B2 | 3/2010 | Tu |
| 7,716,588 B2 | 5/2010 | Iwamura |
| 7,743,326 B2 | 6/2010 | Kanai |
| 7,814,511 B2 | 10/2010 | Macrae et al. |
| 7,818,763 B2 | 10/2010 | Sie et al. |
| 7,870,584 B2 | 1/2011 | Russ et al. |
| 7,877,765 B2 | 1/2011 | Bhogal et al. |
| 7,877,766 B1 | 1/2011 | Wu et al. |
| 7,886,337 B2 | 2/2011 | Williams et al. |
| 7,889,964 B1 | 2/2011 | Barton et al. |
| 7,929,560 B2 | 4/2011 | Morioka |
| 8,046,803 B1 | 10/2011 | Lee |
| 8,122,236 B2 | 2/2012 | Hayward |
| 8,146,130 B2 | 3/2012 | Smith et al. |
| 8,156,528 B2 | 4/2012 | Baumgartner et al. |
| 8,161,412 B2 | 4/2012 | Weeks et al. |
| 8,196,168 B1 | 6/2012 | Bryan et al. |
| 8,214,422 B1* | 7/2012 | Woodward, Jr. ............ H04N 21/25808 709/201 |
| 8,296,792 B2 | 10/2012 | Sahota et al. |
| 8,453,193 B2 | 5/2013 | Barton et al. |
| 8,457,475 B2 | 6/2013 | Ellis et al. |
| 8,526,781 B2 | 9/2013 | Barton et al. |
| 8,528,032 B2 | 9/2013 | Ellis et al. |
| 8,584,184 B2 | 11/2013 | Thomas et al. |
| 8,601,507 B2 | 12/2013 | Billmaier et al. |
| 8,627,385 B2 | 1/2014 | Davies et al. |
| 8,824,865 B2 | 9/2014 | Barton et al. |
| 8,875,198 B1* | 10/2014 | Goodwin ............ H04N 21/25 725/87 |
| 8,893,180 B2 | 11/2014 | Barton et al. |
| 8,948,569 B2 | 2/2015 | Barton et al. |
| 8,965,173 B2 | 2/2015 | Barton et al. |
| 9,258,592 B2 | 2/2016 | Stam |
| 2001/0003184 A1 | 6/2001 | Ching et al. |
| 2001/0003554 A1 | 6/2001 | Mori et al. |
| 2001/0014206 A1 | 8/2001 | Artigalas et al. |
| 2001/0016884 A1 | 8/2001 | Sato et al. |
| 2001/0029583 A1 | 10/2001 | Palatov et al. |
| 2001/0039660 A1 | 11/2001 | Vasilevsky et al. |
| 2001/0042246 A1 | 11/2001 | Yuen et al. |
| 2001/0049648 A1 | 12/2001 | Naylor et al. |
| 2001/0051996 A1 | 12/2001 | Cooper et al. |
| 2002/0002523 A1 | 1/2002 | Kossovsky et al. |
| 2002/0003949 A1 | 1/2002 | Mamiya et al. |
| 2002/0013950 A1 | 1/2002 | Tomsen |
| 2002/0016965 A1 | 2/2002 | Tomsen |
| 2002/0032906 A1 | 3/2002 | Grossman |
| 2002/0032907 A1 | 3/2002 | Daniels |
| 2002/0048349 A1 | 4/2002 | Bixler et al. |
| 2002/0054091 A1 | 5/2002 | Tomsen et al. |
| 2002/0057893 A1 | 5/2002 | Wood et al. |
| 2002/0059363 A1 | 5/2002 | Katz et al. |
| 2002/0067725 A1 | 6/2002 | Oguchi |
| 2002/0078456 A1 | 6/2002 | Hudson et al. |
| 2002/0082973 A1 | 6/2002 | Marbach et al. |
| 2002/0100052 A1 | 7/2002 | Daniels |
| 2002/0104086 A1 | 8/2002 | Tomsen et al. |
| 2002/0120515 A1 | 8/2002 | Morimoto et al. |
| 2002/0120925 A1 | 8/2002 | Logan |
| 2002/0124250 A1 | 9/2002 | Proehl et al. |
| 2002/0146237 A1 | 10/2002 | Safadi |
| 2002/0157002 A1 | 10/2002 | Messerges et al. |
| 2002/0163532 A1 | 11/2002 | Thomas et al. |
| 2002/0164156 A1 | 11/2002 | Bilbrey |
| 2002/0178368 A1 | 11/2002 | Yin et al. |
| 2003/0005463 A1 | 1/2003 | Macrae et al. |

(56) References Cited

U.S. PATENT DOCUMENTS

| | | |
|---|---|---|
| 2003/0014754 A1 | 1/2003 | Chang |
| 2003/0033606 A1 | 2/2003 | Puente et al. |
| 2003/0050966 A1* | 3/2003 | Dutta ............... H04L 29/06 709/203 |
| 2003/0053540 A1 | 3/2003 | Wang et al. |
| 2003/0066093 A1 | 4/2003 | Cruz-Rivera et al. |
| 2003/0076955 A1 | 4/2003 | Alve et al. |
| 2003/0093790 A1 | 5/2003 | Logan et al. |
| 2003/0095791 A1 | 5/2003 | Barton et al. |
| 2003/0097338 A1 | 5/2003 | Mankovich et al. |
| 2003/0110503 A1 | 6/2003 | Perkes |
| 2003/0118014 A1 | 6/2003 | Iyer et al. |
| 2003/0122922 A1 | 7/2003 | Saffer et al. |
| 2003/0145323 A1 | 7/2003 | Hendricks et al. |
| 2003/0149988 A1 | 8/2003 | Ellis et al. |
| 2003/0158958 A1 | 8/2003 | Chiu |
| 2003/0174549 A1 | 9/2003 | Yaguchi et al. |
| 2003/0188153 A1 | 10/2003 | Demoff et al. |
| 2003/0192060 A1 | 10/2003 | Levy |
| 2003/0204613 A1* | 10/2003 | Hudson ............... D01D 5/423 709/231 |
| 2003/0204856 A1* | 10/2003 | Buxton ............ H04N 7/17318 725/120 |
| 2003/0215211 A1 | 11/2003 | Coffin, III |
| 2003/0217328 A1 | 11/2003 | Agassi et al. |
| 2003/0229893 A1 | 12/2003 | Sgaraglino |
| 2003/0229900 A1 | 12/2003 | Reisman |
| 2003/0233623 A1 | 12/2003 | Rao et al. |
| 2004/0003079 A1 | 1/2004 | Aiu et al. |
| 2004/0008289 A1 | 1/2004 | Hwang et al. |
| 2004/0078829 A1* | 4/2004 | Patel ............... G06F 3/0482 725/135 |
| 2004/0086120 A1 | 5/2004 | Akins et al. |
| 2004/0086263 A1 | 5/2004 | Arora |
| 2004/0117483 A1 | 6/2004 | Singer et al. |
| 2004/0122746 A1 | 6/2004 | Charlier et al. |
| 2004/0123129 A1 | 6/2004 | Ginter et al. |
| 2004/0125761 A1 | 7/2004 | Yamaguchi et al. |
| 2004/0139047 A1 | 7/2004 | Reshsteiner et al. |
| 2004/0163130 A1 | 8/2004 | Gray et al. |
| 2004/0187158 A1 | 9/2004 | Fellenstein et al. |
| 2004/0215469 A1 | 10/2004 | Fukushima et al. |
| 2004/0216164 A1 | 10/2004 | Hayhurst |
| 2004/0237100 A1 | 11/2004 | Pinder et al. |
| 2004/0237104 A1 | 11/2004 | Cooper et al. |
| 2004/0250291 A1 | 12/2004 | Rao et al. |
| 2004/0261093 A1 | 12/2004 | Rebaud et al. |
| 2004/0268407 A1 | 12/2004 | Sparrell et al. |
| 2005/0022251 A1 | 1/2005 | Ohnuma et al. |
| 2005/0028208 A1 | 2/2005 | Ellis et al. |
| 2005/0055640 A1 | 3/2005 | Alten |
| 2005/0066362 A1 | 3/2005 | Rambo |
| 2005/0076359 A1 | 4/2005 | Pierson et al. |
| 2005/0086705 A1 | 4/2005 | Jarman et al. |
| 2005/0108519 A1 | 5/2005 | Barton et al. |
| 2005/0120386 A1 | 6/2005 | Stone |
| 2005/0132401 A1 | 6/2005 | Boccon-Gibod et al. |
| 2005/0166258 A1 | 7/2005 | Vasilevsky et al. |
| 2005/0177853 A1 | 8/2005 | Williams et al. |
| 2005/0226601 A1 | 10/2005 | Cohen et al. |
| 2005/0289591 A1 | 12/2005 | Vermola et al. |
| 2006/0013556 A1 | 1/2006 | Poslinski |
| 2006/0089843 A1 | 4/2006 | Flather |
| 2006/0095472 A1 | 5/2006 | Krikorian et al. |
| 2006/0123455 A1 | 6/2006 | Pai et al. |
| 2006/0127039 A1 | 6/2006 | Van Stam |
| 2006/0136966 A1* | 6/2006 | Folk, II ............ H04N 5/44543 725/58 |
| 2006/0184961 A1 | 8/2006 | Lee et al. |
| 2007/0015237 A1 | 1/2007 | Bailey et al. |
| 2007/0086724 A1 | 4/2007 | Grady et al. |
| 2007/0250445 A1 | 10/2007 | Ache |
| 2008/0010130 A1 | 1/2008 | Pyhalammi et al. |
| 2008/0066127 A1 | 3/2008 | Schechinger et al. |
| 2008/0092168 A1 | 4/2008 | Logan et al. |
| 2008/0104199 A1 | 5/2008 | Kalaboukis |
| 2008/0104202 A1 | 5/2008 | Barrett et al. |
| 2008/0212949 A1 | 9/2008 | Wachtfogel |
| 2009/0028529 A1* | 1/2009 | Kuhns ............... H04N 5/85 386/296 |
| 2009/0136215 A1 | 5/2009 | Barton et al. |
| 2009/0241158 A1 | 9/2009 | Campagna et al. |
| 2009/0284693 A1 | 11/2009 | Adachi et al. |
| 2009/0320056 A1 | 12/2009 | Wu et al. |
| 2010/0049867 A1* | 2/2010 | Panwar ............ H04L 29/06027 709/231 |
| 2010/0192175 A1 | 7/2010 | Bachet et al. |
| 2010/0226627 A1 | 9/2010 | Barton et al. |
| 2010/0280876 A1 | 11/2010 | Bowra |
| 2010/0313238 A1 | 12/2010 | Baumgartner et al. |
| 2011/0116766 A1 | 5/2011 | Sie et al. |
| 2011/0135271 A1 | 6/2011 | Van Hoff et al. |
| 2012/0027383 A1 | 2/2012 | Barton et al. |
| 2012/0131631 A1 | 5/2012 | Bhogal et al. |
| 2013/0163954 A1 | 6/2013 | Barton et al. |
| 2013/0243393 A1 | 9/2013 | Barton et al. |
| 2013/0247092 A1 | 9/2013 | Barton et al. |
| 2013/0315569 A1 | 11/2013 | Ellis et al. |
| 2014/0003791 A1 | 1/2014 | Barton et al. |
| 2014/0016912 A1 | 1/2014 | Lockett et al. |
| 2014/0056572 A1 | 2/2014 | Barton et al. |
| 2014/0059593 A1 | 2/2014 | Smith et al. |
| 2014/0089984 A1* | 3/2014 | Fujita ............... H04N 21/4334 725/53 |
| 2014/0380353 A1 | 12/2014 | Barton et al. |

FOREIGN PATENT DOCUMENTS

| | | |
|---|---|---|
| EP | 0977 200 | 2/2000 |
| EP | 0987 888 | 3/2000 |
| GB | 375923 | 11/2002 |
| JP | 02-071633 | 3/1990 |
| JP | H02-71633 | 3/1990 |
| JP | 05-114194 | 5/1993 |
| JP | 05-182294 | 7/1993 |
| JP | 07-212331 | 8/1995 |
| JP | H09-65267 | 3/1997 |
| JP | 09-135391 | 5/1997 |
| JP | H10-164521 | 6/1998 |
| JP | 10-208392 | 8/1998 |
| JP | H11-103452 | 4/1999 |
| JP | 11-187324 | 7/1999 |
| JP | H11-187324 | 7/1999 |
| JP | 2000-013755 | 1/2000 |
| JP | 2001-126009 | 5/2001 |
| JP | 2001-160003 | 6/2001 |
| JP | 2001-325461 | 11/2001 |
| JP | 2001-338242 | 12/2001 |
| JP | 2002-222138 | 8/2002 |
| JP | 2003-108371 | 4/2003 |
| JP | 2003141031 | 5/2003 |
| JP | 2003-224794 | 8/2003 |
| JP | 2003-229903 A | 8/2003 |
| JP | 2003-525550 A | 8/2003 |
| JP | 2003-259333 A | 9/2003 |
| JP | 2003-324432 A | 11/2003 |
| JP | 2003-324711 A | 11/2003 |
| JP | 2003-333574 | 11/2003 |
| JP | 2004-007185 A | 1/2004 |
| JP | 2004-078424 A | 3/2004 |
| JP | 2004-193920 | 7/2004 |
| JP | 2004-222014 | 8/2004 |
| JP | 2006-506883 | 2/2006 |
| JP | 2007-052574 | 3/2007 |
| WO | WO1992022938 | 12/1992 |
| WO | WO1992022983 | 12/1992 |
| WO | WO1997015143 | 4/1997 |
| WO | WO1998007273 | 2/1998 |
| WO | WO1998011723 | 3/1998 |
| WO | WO 98/17064 | 4/1998 |
| WO | WO1998017064 | 4/1998 |
| WO | WO1998048566 | 10/1998 |
| WO | WO1998058306 | 12/1998 |

(56) References Cited

FOREIGN PATENT DOCUMENTS

| WO | WO 99/17549 | 4/1999 |
|---|---|---|
| WO | WO1999038321 | 7/1999 |
| WO | WO9949717 | 10/1999 |
| WO | WO1999052278 | 10/1999 |
| WO | WO2000004549 | 1/2000 |
| WO | WO2000036833 | 6/2000 |
| WO | WO 01/10127 A | 2/2001 |
| WO | WO2001022729 | 3/2001 |
| WO | WO 01/45407 | 6/2001 |
| WO | WO 01/53963 | 7/2001 |
| WO | WO 01/65862 A | 9/2001 |
| WO | WO 01/67756 A2 | 9/2001 |
| WO | WO2002001330 | 1/2002 |
| WO | WO 02/43353 A | 5/2002 |
| WO | WO 02/098063 | 12/2002 |
| WO | WO2003/043326 | 5/2003 |
| WO | WO2003043326 | 5/2003 |
| WO | WO2004001614 | 12/2003 |
| WO | WO2004008289 | 1/2004 |
| WO | WO2005060659 | 7/2005 |
| WO | WO 2005/079499 | 9/2005 |
| WO | WO2007144728 | 12/2007 |
| WO | WO2008002309 | 1/2008 |
| WO | WO2008054802 | 5/2008 |
| WO | WO2009026411 | 2/2009 |

OTHER PUBLICATIONS

Chinese Patent Office, Application No. 200410039972.8, Office Action dated Nov. 4, 2005, 8 pages.
Chinese Patent Office, Application No. 200580039507.7, Foreign Office Action dated Jun. 30, 2015.
Chinese Patent Office, Application No. 200580039507.7, Pending Claims as of Jun. 30, 2015.
Chinese Patent Office, Application No. 201210083646.1, Foreign Office Action dated Oct. 17, 2014.
Chinese Patent Office, Application No. 201210083646.1, Notice of Allowance dated May 27, 2015.
Chinese Patent Office, Application No. 201210083646.1, Pending Claims as of Oct. 17, 2014.
Chinese Patent Office, Application No. 201210083646.1, Pending Claims as of May 27, 2015.
European Patent Office, Application No. 04700913.9, Pending Claims as of Aug. 12, 2015.
European Patent Office, Application No. 04700913.9, Summons to Oral Proceedings dated Aug. 12, 2015.
European Patent Office, Application No. 04814400.0, Office Action dated Sep. 6, 2013.
European Patent Office, Application No. 04814400.0, Pending Claims as of Sep. 6, 2013.
European Patent Office, Application No. 04814401.8, Foreign Office Action dated Nov. 27, 2014.
European Patent Office, Application No. 04814401.8, Pending Claims as of Nov. 27, 2014.
European Patent Office, Application No. 05851949.7, Pending Claims as of Oct. 27, 2015.
European Patent Office, Application No. 05851949.7, Summons to Oral Proceedings dated Oct. 27, 2015.
European Patent Office, Application No. 10153517.7, Extended European Search Report dated Aug. 31, 2012.
European Patent Office, Application No. 10153517.7, Pending Claims as of Aug. 31, 2012.
European Patent Office, Application No. 10180631.3, Extended European Search Report dated Aug. 31, 2012.
European Patent Office, Application No. 10180631.3, Pending Claims as of Aug. 31, 2012.
European Patent Office, Application No. 11182065.0, Foreign Office Action dated Dec. 4, 2015.
European Patent Office, Application No. 11182065.0, Pending Claims as of Dec. 4, 2015.
European Patent Office, Application No. 12167801.5, Extended European Search Report dated Sep. 10, 2015.
European Patent Office, Application No. 12167801.5, Pending Claims as of Sep. 10, 2015.
Japanese Patent Office, Application No. 2007-508490, Foreign Office Action dated Jul. 9, 2013.
Japanese Patent Office, Application No. 2007-508490, Pending Claims as of Jul. 9, 2013.
Japanese Patent Office, Application No. 2010-239085, Foreign Office Action dated Dec. 24, 2013.
Japanese Patent Office, Application No. 2010-239085, Pending Claims as of Dec. 24, 2013.
Japanese Patent Office, Application No. 2012-052320, Foreign Office Action dated Jul. 9, 2013.
Japanese Patent Office, Application No. 2012-052320, Foreign Office Action dated Jun. 17, 2014.
Japanese Patent Office, Application No. 2012-052320, Notice of Allowance dated Jan. 13, 2015.
Japanese Patent Office, Application No. 2012-052320, Pending Claims as of Jul. 9, 2013.
Japanese Patent Office, Application No. 2012-052320, Pending Claims as of Jun. 17, 2014.
Japanese Patent Office, Application No. 2012-052320, Pending Claims as of Jan. 13, 2015.
United States Patent and Trademark Office, U.S. Appl. No. 10/339,700, Final Office Action dated Oct. 20, 2006.
United States Patent and Trademark Office, U.S. Appl. No. 10/339,700, Final Office Action dated Feb. 7, 2007.
United States Patent and Trademark Office, U.S. Appl. No. 10/741,596, Advisory Action dated Jul. 20, 2012.
United States Patent and Trademark Office, U.S. Appl. No. 12/651,339, Final Office Action dated Aug. 10, 2012.
United States Patent and Trademark Office, U.S. Appl. No. 12/910,741, Non-Final Office Action dated Jan. 2, 2013.
United States Patent and Trademark Office, U.S. Appl. No. 12/651,339, Non-Final Office Action dated Apr. 5, 2013.
United States Patent and Trademark Office, U.S. Appl. No. 12/948,174, Non-Final Office Action dated Apr. 5, 2013.
United States Patent and Trademark Office, U.S. Appl. No. 10/741,596, Non-Final Office Action dated May 3, 2013.
United States Patent and Trademark Office, U.S. Appl. No. 12/910,741, Final Office Action dated Jun. 3, 2013.
United States Patent and Trademark Office, U.S. Appl. No. 12/704,245, Non-Final Office Action dated Jun. 11, 2013.
United States Patent and Trademark Office, U.S. Appl. No. 10/741,596, Final Office Action dated Oct. 11, 2013.
United States Patent and Trademark Office, U.S. Appl. No. 12/651,339, Final Office Action dated Feb. 5, 2014.
United States Patent and Trademark Office, U.S. Appl. No. 10/741,596, Final Office Action dated Mar. 25, 2014.
United States Patent and Trademark Office, U.S. Appl. No. 12/704,245, Final Office Action dated Apr. 7, 2014.
United States Patent and Trademark Office, U.S. Appl. No. 12/910,741, Non-Final Office Action dated Dec. 5, 2014.
United States Patent and Trademark Office, U.S. Appl. No. 12/910,741, Final Office Action dated Apr. 10, 2015.
United States Patent and Trademark Office, U.S. Appl. No. 12/651,339, Non-Final Office Action dated Jun. 18, 2015.
United States Patent and Trademark Office, U.S. Appl. No. 12/704,245, Non-Final Office Action dated Jun. 24, 2015.
United States Patent and Trademark Office, U.S. Appl. No. 14/460,993, Non-Final Office Action dated Oct. 21, 2015.
United States Patent and Trademark Office, U.S. Appl. No. 12/539,505, Non-Final Office Action dated Aug. 20, 2012.
United States Patent and Trademark Office, U.S. Appl. No. 12/572,023, Non-Final Office Action dated Sep. 12, 2012.
United States Patent and Trademark Office, U.S. Appl. No. 12/572,037, Non-Final Office Action dated Sep. 13, 2012.
United States Patent and Trademark Office, U.S. Appl. No. 12/539,505, Final Office Action dated Dec. 3, 2012.
United States Patent and Trademark Office, U.S. Appl. No. 12/572,037, Final Office Action dated Jan. 11, 2013.

(56) References Cited

OTHER PUBLICATIONS

United States Patent and Trademark Office, U.S. Appl. No. 11/285,411, Final Office Action dated Jan. 22, 2013.
United States Patent and Trademark Office, U.S. Appl. No. 13/027,117, Final Office Action dated Feb. 25, 2013.
United States Patent and Trademark Office, U.S. Appl. No. 10/958,897, Non-Final Office Action dated Mar. 5, 2013.
United States Patent and Trademark Office, U.S. Appl. No. 12/572,037, Non-Final Office Action dated Mar. 28, 2013.
United States Patent and Trademark Office, U.S. Appl. No. 12/539,505, Non-Final Office Action dated Apr. 9, 2013.
United States Patent and Trademark Office, U.S. Appl. No. 12/572,023, Notice of Allowance dated Apr. 11, 2013.
United States Patent and Trademark Office, U.S. Appl. No. 13/267,855, Non-Final Office Action dated Jun. 5, 2013.
United States Patent and Trademark Office, U.S. Appl. No. 12/572,037, Notice of Allowance dated Jun. 21, 2013.
United States Patent and Trademark Office, U.S. Appl. No. 13/027,078, Non-Final Office Action dated Jul. 15, 2013.
United States Patent and Trademark Office, U.S. Appl. No. 11/285,411, Non-Final Office Action dated Aug. 2, 2013.
United States Patent and Trademark Office, U.S. Appl. No. 13/267,855, Interview Summary dated Aug. 26, 2013.
United States Patent and Trademark Office, U.S. Appl. No. 13/021,625, Final Office Action dated Sep. 5, 2013.
United States Patent and Trademark Office, U.S. Appl. No. 12/539,505, Notice of Allowance dated Sep. 10, 2013.
United States Patent and Trademark Office, U.S. Appl. No. 13/253,913, Final Office Action dated Sep. 24, 2013.
United States Patent and Trademark Office, U.S. Appl. No. 12/572,037, Final Office Action dated Oct. 10, 2013.
United States Patent and Trademark Office, U.S. Appl. No. 10/418,646, Advisory Action dated Nov. 7, 2013.
United States Patent and Trademark Office, U.S. Appl. No. 13/867,932, Final Office Action dated Dec. 4, 2013.
United States Patent and Trademark Office, U.S. Appl. No. 13/267,855, Final Office Action dated Dec. 4, 2013.
United States Patent and Trademark Office, U.S. Appl. No. 10/418,646, Non-Final Office Action dated Jan. 7, 2014.
United States Patent and Trademark Office, U.S. Appl. No. 13/021,625, Final Office Action dated Jan. 8, 2014.
United States Patent and Trademark Office, U.S. Appl. No. 11/285,411, Final Office Action dated Jan. 30, 2014.
United States Patent and Trademark Office, U.S. Appl. No. 13/007,619, Non-Final Office Action dated Mar. 10, 2014.
United States Patent and Trademark Office, U.S. Appl. No. 13/253,913, Notice of Allowance dated Mar. 13, 2014.
United States Patent and Trademark Office, U.S. Appl. No. 13/459,995, Non-Final Office Action dated Jun. 4, 2014.
United States Patent and Trademark Office, U.S. Appl. No. 13/867,932, Non-Final Office Action dated Aug. 1, 2014.
United States Patent and Trademark Office, U.S. Appl. No. 13/867,932, Final Office Action dated Aug. 1, 2014.
United States Patent and Trademark Office, U.S. Appl. No. 13/021,625, Final Office Action dated Aug. 11, 2014.
United States Patent and Trademark Office, U.S. Appl. No. 13/459,995, Final Office Action dated Nov. 3, 2014.
United States Patent and Trademark Office, U.S. Appl. No. 13/267,855, Non-Final Office Action dated Dec. 18, 2014.
United States Patent and Trademark Office, U.S. Appl. No. 11/285,490, Non-Final Office Action dated Mar. 3, 2015.
United States Patent and Trademark Office, U.S. Appl. No. 11/285,411, Notice of Allowance dated Jun. 5, 2015
United States Patent and Trademark Office, U.S. Appl. No. 11/285,490, Final Office Action dated Aug. 7, 2015.
United States Patent and Trademark Office, U.S. Appl. No. 11/285,411, Notice of Allowance dated Sep. 30, 2015.
United States Patent and Trademark Office, U.S. Appl. No. 14/460,993, Final Office Action dated Feb. 19, 2016.
United States Patent and Trademark Office, U.S. Appl. No. 12/651,339, Final Office Action dated Mar. 25, 2016.
Chinese Patent Office, Application No. 200480033609.3, Foreign Office Action dated Oct. 9, 2013.
Chinese Patent Office, Application No. 200480033609.3, Foreign Office Action dated Apr. 30, 2014.
Chinese Patent Office, Application No. 200480033609.3, Pending Claims as of Oct. 9, 2013.
Chinese Patent Office, Application No. 200480033609.3, Pending Claims as of Apr. 30, 2014.
European Patent Office, Application No. 05851948.9, Office Action dated Feb. 13, 2013.
European Patent Office, Application No. 05851948.9, Pending Claims as of Feb. 13, 2013.
European Patent Office, Application No. 05851948.9, Pending Claims as of Nov. 2, 2015.
European Patent Office, Application No. 05851948.9, Summons to Oral Proceedings dated Nov. 2, 2015.
European Patent Office, Application No. 11195319.6, Foreign Office Action dated Mar. 21, 2014.
European Patent Office, Application No. 11195319.6, Pending Claims as of Mar. 21, 2014.
Iannella, R. "Open Digital Rights Language (ODRL): Version 0.9", IPR Systems Pty Ltd. 2001, Jun. 29, 2001 (46 pages).
United States Patent and Trademark Office, U.S. Appl. No. 14/460,993, Non-Final Office Action dated Aug. 5, 2016.
United States Patent and Trademark Office, U.S. Appl. No. 12/910,741, Final Office Action dated Nov. 9, 2016.
European Patent Office, Application No. 11182065.0, Notice of Allowance dated Nov. 29, 2016.
European Patent Office, Application No. 11182065.0, Pending Claims as of Nov. 29, 2016.
U.S. Appl. No. 60/379,635.
United States Patent and Trademark Office, U.S. Appl. No. 12/910,741, Non-Final Office Action dated Apr. 14, 2016.
United States Patent and Trademark Office, U.S. Appl. No. 12/704,245, Final Office Action dated Apr. 26, 2016.
United States Patent and Trademark Office, U.S. Appl. No. 11/285,490, Non-Final Office Action dated Jun. 13, 2016.

* cited by examiner

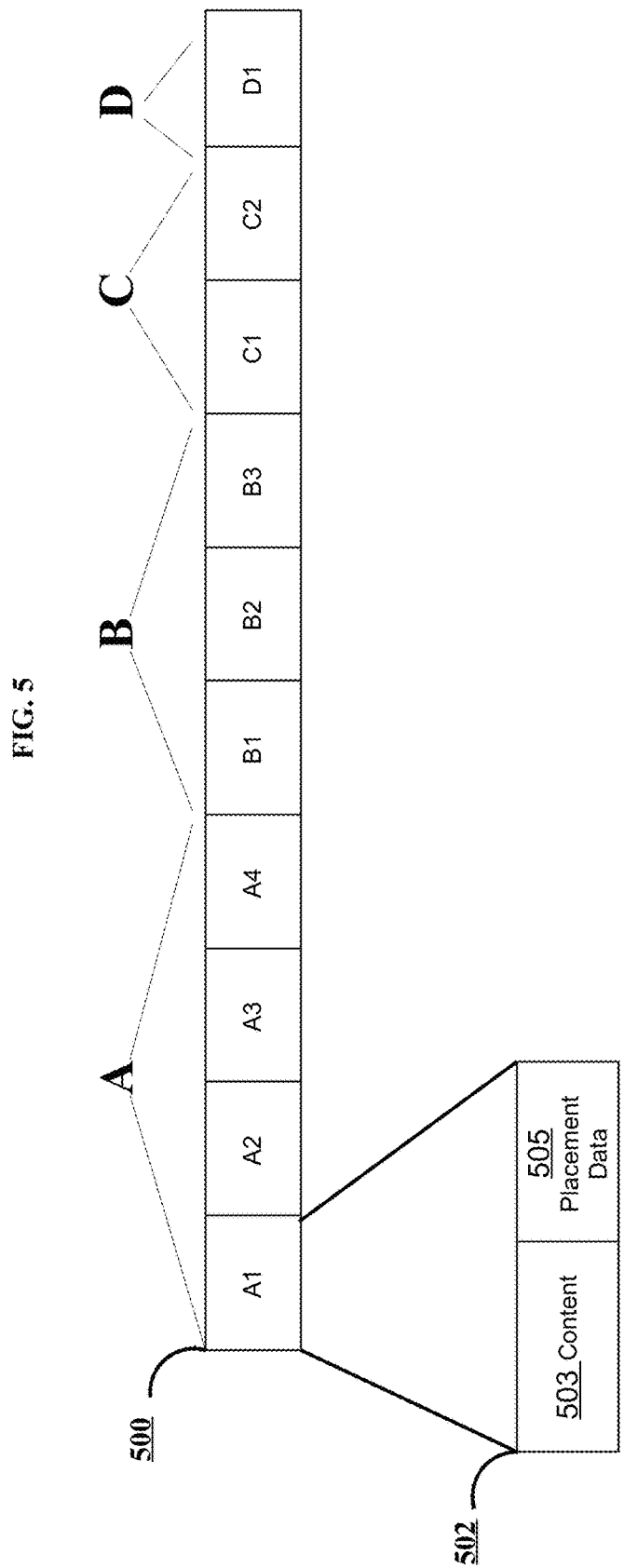

SECURE TRANSFER OF PREVIOUSLY BROADCASTED CONTENT

CROSS-REFERENCE TO RELATED APPLICATIONS

Priority Claim

This application claims benefit under 35 U.S.C. § 120 as a Continuation of U.S. application Ser. No. 14/285,411, filed Nov. 21, 2005, which claims the benefit of Provisional Application No. 60/630,398, filed Nov. 19, 2004, the entire contents of the aforementioned are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to the secure transfer of content between devices over a network. Specifically, the invention relates to a method and apparatus for obtaining previously broadcasted content and the secure transfer of the content.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

TV viewers can record broadcasted TV programs using a videocassette recorder (VCR). As such, A VCR user can record a particular TV program at the time it is broadcasted and play the same recorded TV program at a later time. In order to accomplish this, A VCR changes the electrical signals representing a TV program into magnetic signals and stores the magnetic signals on magnetic tape. The magnetic tape is usually in the form of a videocassette tape inserted into the VCR by the VCR user. When a VCR user decides to play back the TV program, the process is reversed, and the VCR changes the magnetic signals stored on the videocassette tape into electrical signals and sends the electrical signals to a TV set.

With the development of digital technology, VCRs are being replaced by digital video recorders (DVRs). Like a VCR, a DVR records broadcasted TV programs for later playback by changing electrical signals of the TV program into digital information and storing the digital information in a memory device. When the user plays back the recorded TV program, the DVR converts the digital information back to analog signals and sends the signals to the TV set which displays the TV program for the viewer.

DVRs are becoming increasingly popular and widely used for recording broadcasted TV programs. However, DVR users frequently forget to record or schedule the recording of particular TV programs. Further, users may not realize the program was broadcasted, or simply did not desire to record the show at the time. Because the DVR did not record the program, the DVR user has no way of viewing the program again unless it is re-broadcasted. Further, DVRs occasionally do not record a program that a user scheduled for recording because of a conflict or other reasons. Thus, a particular drawback to a conventional DVR is the inability to playback content that was not previously recorded by the DVR.

What is desired is to establish a communication system through which a DVR may receive previously broadcasted content from one or more DVRs across a network.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is a block diagram illustrating portions of previously broadcasted content for transfer according to one embodiment of the invention.

DETAILED DESCRIPTION

Figure 1A:
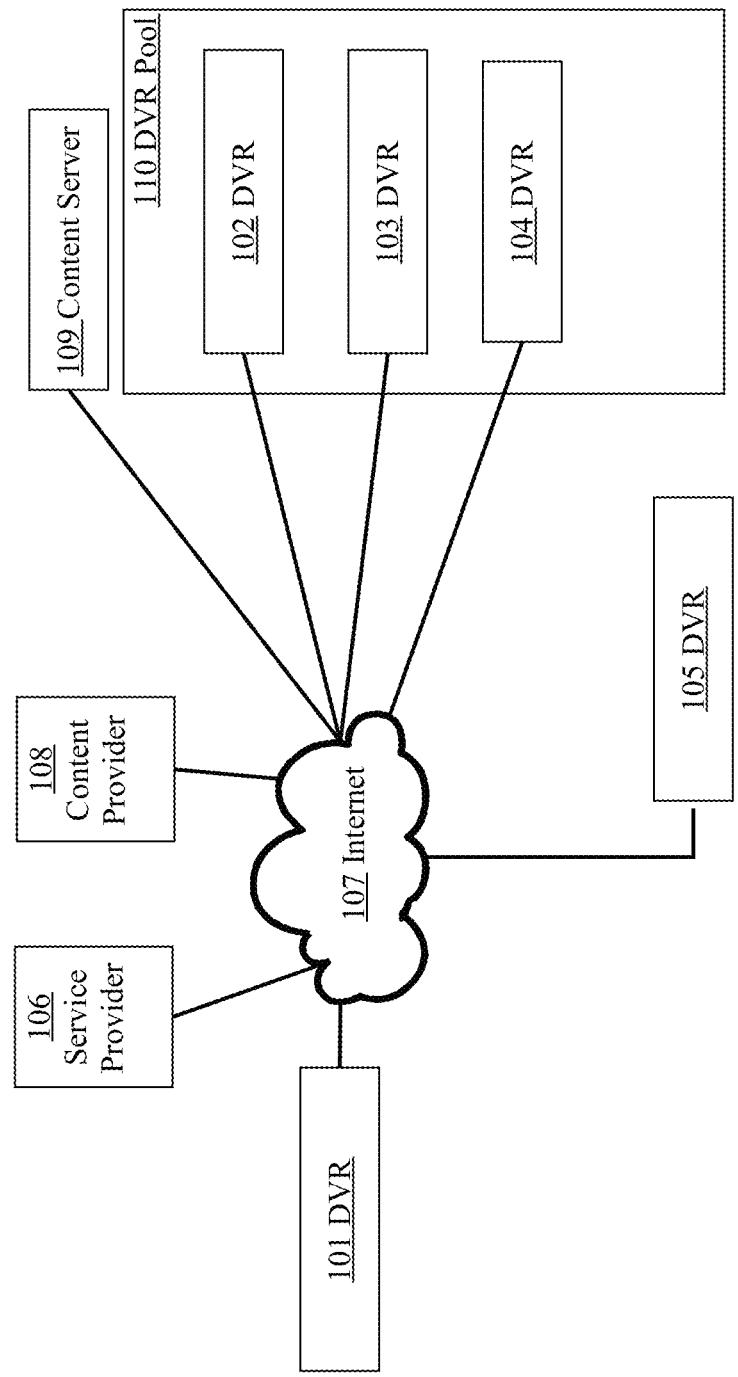
FIG. 1A is a block diagram illustrating a communication system for secure transfer of previously broadcasted content according to one embodiment of the invention.

A method and apparatus for providing secure transfer of previously broadcasted content is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural Overview
3.0 Approach for Secure Transfer of Previously Broadcasted Content
   3.1 Requesting Previously Broadcasted Content
   3.2 Validation and Authorization
   3.3 Creating a DVR Pool 3.4 Initiating a Transfer of Previously Broadcasted Content
4.0 Implementation Mechanisms—Hardware Overview
5.0 Extensions and Alternatives
1.0 General Overview The needs identified in the foregoing Background, and other needs and objects that will become apparent for the following description, are achieved in the present invention, which comprises, in one aspect, a method for secure transfer of previously broadcasted content. DVR users are offered a means by which they may request and receive previously broadcasted content not recorded or stored on the user's DVR.

A DVR user who wishes to retrieve content that was previously broadcasted but not recorded is presented with a user interface for requesting the previously broadcasted content. Once the user selects the previously broadcasted content, the request is sent to the service provider, which validates and authorizes the request. The service provider validates the request by inspecting data associated with the user to determine if the user should be allowed to retrieve the previously broadcasted content. The service provider authorizes the request by inspecting data associated with the previously broadcasted content to determine if the previously broadcasted content is allowed to be retrieved.

Once the service provider validates and authorizes the request, the service provider identifies one or more DVRs on a computer network that currently have the previously broadcasted content stored on their respective storage devices. The service provider filters the one or more DVRs according to a number of factors, including bandwidth, to create a pool of DVRs for transferring the previously broadcasted content.

The service provider initiates the transfer by either requesting each DVR in the pool of DVRs to begin transferring the previously broadcasted content to the requesting DVR, or by directly requesting the DVR to retrieve the content from the pool of DVRs. The previously broadcasted content is sent to the requesting DVR in portions which are re-assembled at the DVR and stored for later playback.

In other aspects, the invention encompasses a computer apparatus and a computer-readable medium configured to carry out the foregoing steps.

2.0 Structural Overview

Referring to FIG. 1A, in accordance with one embodiment, a communication system for distributing content between DVRs across a network is shown. The communication system contains DVRs 101, 102, 103, 104 and 105. DVRs 101-105 are communicatively coupled to Internet 107 through any proper communication interface, such as an Ethernet or wireless communications port. Further, DVRs 101-105 may initiate a connection to Internet 107 by calling a local access telephone number for an Internet service provider (ISP). The functionality of a DVR is typified in U.S. Pat. No. 6,233,389 which is owned by the Applicant and is hereby incorporated by reference.

Content Server 109 may be a network device which stores programming content for retrieval by other network devices. For instance, Content Server 109 may be a web server consisting of multimedia content for download. Further Content Server 109 may be a personal computer (PC) connected to Internet 107.

In one embodiment, Content Provider 108 provides original broadcast programming content to DVR users. Thus, Content Provider 108 controls access to any of its program content and authorizes DVR transactions by communicating with the Service Provider 106. Service Provider 106 communicates with Content Provider 108 to authorize DVR transfers and determine program content restrictions.

Service Provider 106, Content Provider 108 and Content Server 109 are also communicatively coupled to Internet 107 through any proper interface. Accordingly, each DVR 101-105 may establish a connection with Service Provider 106, Content Provider 108 or Content Server 109 through Internet 107 using any acceptable communications protocol. Alternatively, each DVR 101-105 may be directly connected to the Service Provider 106 by using an internal telephone modem to dial into an incoming call modem bank located at the Service Provider 106.

In one embodiment, DVR 101 communicates with Service Provider 106, which provides program guide data, graphical resources (such as fonts, pictures, etc.), service information, software programs, advertisements, and other forms of data that enable DVR 101 to operate independently of the Service Provider 106 to satisfy viewer interests. Communication between DVR 101 and Service Provider 106 utilizes a secure distribution architecture to transfer data between the DVR 101 and the Service Provider 106 such that both the service data and the user's privacy are protected.

Further, each DVR may use Internet 107 to establish communication with other DVRs. For instance, DVR 101 may use Internet 107 to establish a communication channel with DVRs 102-105 and vice versa. When one DVR 101 wishes to establish a communication channel with another DVR 102, each DVR may utilize a secure communication path through the use of encryption keys to ensure that third parties do not intercept any messages between DVRs 101 and 102.

Figure 1B:
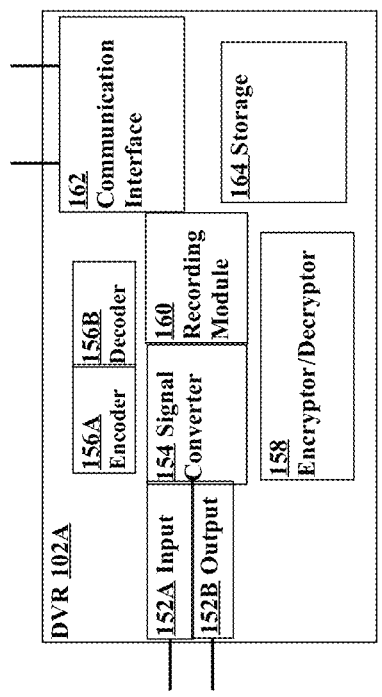
FIG. 1B is a block diagram illustrating a general overview of the components of a Digital Video Recorder (DVR) according to one embodiment of the invention.

Referring to FIG. 1B, in an embodiment, DVR 101 generally comprises a plurality of components, signified by Signal Converter 154, that are necessary to digitize an analog television signal and convert it into a digital data stream or to accept a digital data stream. DVR 101 receives broadcast signals from an antenna, from a cable TV system, satellite receiver, etc., via Input 152A. Input 152A may comprise a plurality of tuning modules that allow a plurality of signals to be received and recorded simultaneously.

Recording Module 160 records the incoming data stream by storing the digital data stream on at least one storage facility, signified by Storage 164 that is designed to retain segments of the digital data stream. A Signal Converter 154 retrieves segments of the data stream, convert the data stream into an analog signal, and then modulate the signal onto a RF carrier, via Output 152B, through which the signal is delivered to a standard TV set. Output 152B may alternatively deliver a digital signal to a TV set or video monitor. For example, DVR 101 may utilize a Digital Visual Interface port (DVI) for sending digital signals to a TV via a DVI cable.

DVR 101 also includes a Communication Interface 162, through which the DVR 101 communicates with Network 105 via Ethernet, wireless network, modem, or other communications standard.

In another embodiment, DVR 101 generally comprises a plurality of components necessary to receive, record, store, transfer and playback digital data signals from a plurality of sources, such as a PC, a DVR, a service provider, or content server. DVR 101 can transfer digital data signals to another DVR or PC. DVR 101 may encode or decode digital signals via Encoder 156A and Decoder 156B into a plurality of formats for playback, storage or transfer. DVR 101 can also encrypt or decrypt digital data signals using Encryptor/Decryptor 158 for storage, transfer or playback of the digital data signals. Further, DVR 101 may be integrated into a TV system such that the components described above are housed in a TV set capable of performing the functions of each component of DVR 101.

In the discussion below reference is frequently made to DVR 101. However, it should be noted that DVR 101 may instead be a PC, a portable device such as a Personal Digital Assistant (PDA) or mobile phone, or any other device capable of performing the functions of DVR 101.

3.0 Approach for Secure Transfer of Previously Broadcasted Content 3.1 Requesting Previously Broadcasted Content In one embodiment, assume the user of DVR 101 wishes to obtain program content that was previously broadcasted but DVR 101 did not record. Thus, the program content is not stored on DVR 101 and is not available for playback.

Through the control interface of DVR 101, a user may view a listing of programs the DVR has previously recorded. In one embodiment, the DVR 101 can display a list of shows the user requested the DVR to record but the DVR did not record for any particular reason. One such reason could be, for instance, the recording would have conflicted with another program the DVR was scheduled to record. Further, DVR 101 can display programs that the user might have been interested in but did not record. For instance DVR 101 may track the viewing habits of a particular user to identify similar programs that might be of interest to a user. Additionally, a viewer might simply not record a program but later decide the program should have been recorded. Regardless, DVR 101 provides an interface for requesting any previously broadcasted program through the user-interface of the DVR 101. For instance, DVR 101 may provide a program guide of previously broadcasted program content for the user. A user can thus select any program in the program guide and proceed to request the previously broadcasted content for download. Typically, the DVR has an electronic program guide that covers several weeks and the user has access to several past days of programming.

When the user decides to retrieve the previously broadcasted content, the user can use an appropriate control interface, such as a remote control to select the particular program content and initiate a request. Alternatively, instead of using the DVR interface, the user can submit a request for the previously recorded content through the Service Provider 106 website. For instance, a user can log on to the web site of Service Provider 106 and provide information regarding the previously broadcasted program. Alternatively, the Service Provider 106 may provide a user with a program guide similar to the program guide provided by DVR 101 for selecting program content.

Figure 2:
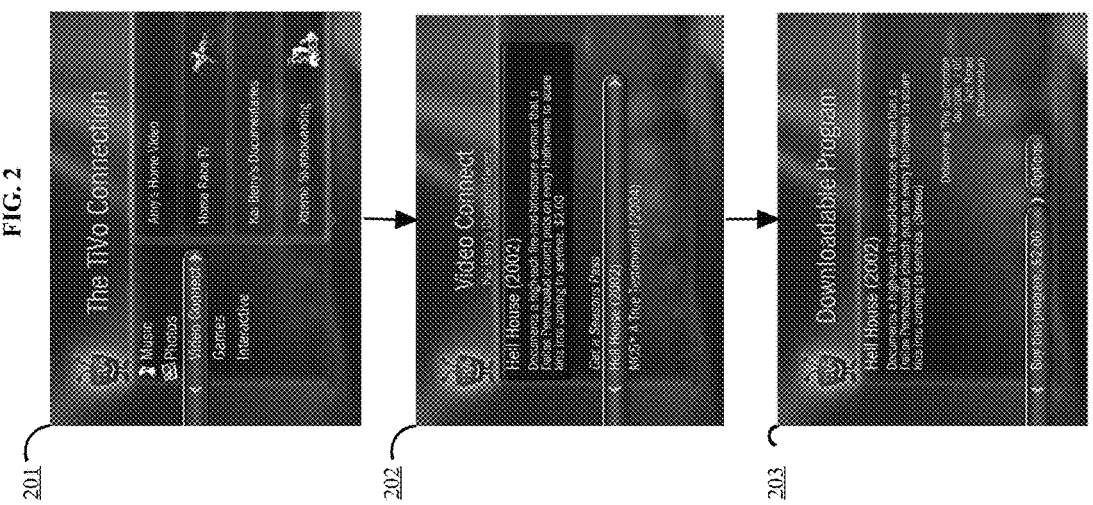
FIG. 2 is a block diagram illustrating a user-interface presented to a user of a DVR for requesting the transfer of previously broadcasted content according to one embodiment of the invention.

Referring to FIG. 2, according to one embodiment, a user interface for requesting previously broadcasted content is shown. Through a standard TV set or monitor connected to DVR 101, DVR 101 causes screen 201 to be presented to a user of DVR 101. Screen 201 contains selectable options, one of which is the "Video Connect" option for requesting previously broadcasted content. Alternatively, Screen 201 may contain a listing of broadcasted content the user has requested to be recorded, but DVR 101 failed to record. Further, Screen 201 may simply be a TV program guide of previously broadcasted shows for the user to select.

A user of DVR 101 can select options displayed on Screen 201 by utilizing any appropriate control interface, such as a remote control associated with DVR 101. When the user selects the "Video Connect" option, DVR 101 causes screen 202 to be presented. Screen 202 displays information regarding the previously broadcasted program. In one embodiment, such information may be the title, duration, and description of the multimedia content. Further, Screen 202 may contain additional information, such as the availability of the content as well as the estimated amount of time it will take to obtain the previously broadcasted content. Further, Screen 202 can present additional information, such as the number of DVRs in the DVR pool for the selected program. Such information may be obtained by DVR 101 when DVR 101 communicates with Service Provider 106 through Internet 107 or a standard telephone line. When the user selects the particular multimedia content, DVR 101 causes screen 203 to be presented to the user. According to one embodiment, Screen 203 is a confirmation screen which requests that a DVR user confirm the selection of previously broadcasted content.

Alternatively, Screen 203 includes an option for purchasing the previously broadcasted content, if required, and for requesting the transfer of the content from the DVR Pool 110. Once the user selects to purchase and download the multimedia content, DVR 101 sends a request to Content Server 106B to initiate a transfer of the multimedia content to DVR 101. In other embodiments, the user may receive the previously broadcasted content free of charge. For instance, the user may have previously paid for the multimedia content or the multimedia content may be free of charge.

In another embodiment, a user may request previously broadcasted content by logging onto the website of Service Provider 106. Thus, Screens 201, 202 and 203 may be web pages presented to a user accessing the Service Provider 106 through Internet 107. To request the transfer of previously broadcasted content to DVR 101, a user will enter information identifying the previously broadcasted content, as well as a unique identifier for DVR 101. The Service Provider 106 uses this information to locate the DVR 101 and the content and to proceed with the transaction.

In another embodiment, whether through the DVR interface or through the website of Service Provider 106, a payment structure can be built into the system such that the user is charged each time a previously broadcasted program content is received by DVR 101. Thus, an additional screen requesting billing or payment information may be displayed to the user to enter in the appropriate information. This information is then supplied to the Service Provider 106 as part of the request for content. Alternatively, the billing or payment information may have been previously supplied to and stored by the Service Provider 106, such that any subsequent request for previously broadcasted program content is automatically processed without presenting another screen to the DVR user.

Next, the request message, along with any additional data, is sent to the Service Provider 106. The message may be sent through Internet 107 via a communication interface of the DVR. Alternatively, the request can be stored by the DVR and sent to the Service Provider 106 when the DVR establishes a connection to Service Provider 106 directly through a telephone line using a built-in modem.

3.2 Validation and Authorization

When the Service Provider 106 receives the request, the Service Provider 106 processes the request by validating the user or DVR 101, authorizing the transfer of the previously broadcasted program content, creating a pool of source DVRs and initiating a transfer between the source DVRs and DVR 101.

Figure 1C:
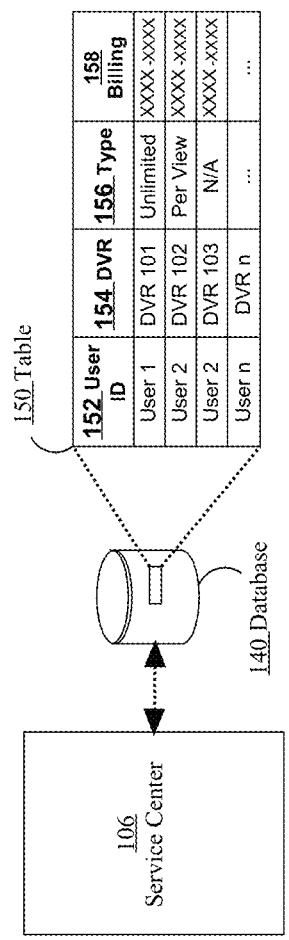
FIG. 1C is a block diagram illustrating a communication system for validating requests for previously broadcasted content according to one embodiment of the invention.

Referring to FIG. 1C, according to one embodiment, Service Provider 106 is communicatively coupled to a database containing information for each user and/or DVR associated with the Service Provider 106. The database is comprised of data gathered by the Service Provider 106 when it establishes a connection with any DVR. Thus, each time DVRs 101-105 connect to the Service Provider 106, whether through Internet 107 or via a telephone line, Service Provider 106 gathers various data from each DVR, such as the content stored on the DVR, a schedule of upcoming recordings, billing information, user information, encryption keys and any other appropriate information. The transfer of such information from DVRs 101-105 to Service Provider 106 is conducted via a secure distribution architecture such that any sensitive information is not intercepted by third parties. Once Service Provider 106 has received this information, it stores it in Database 140. Database 140 is communicatively coupled to Service Provider 106. In one embodiment, Database 140 is located on a storage device of Service Provider 106. In another embodiment, Database 140 may be located on a local network.

In order to determine that a particular DVR or user is allowed to receive previously broadcasted content, the Service Provider 106 can check the database to determine if the user's subscription type allows for previously broadcasted content. In one embodiment, the Service Provider 106 may require the user to pay a specific subscription fee for accessing all previously recorded content. Alternatively, the Service Provider 106 may provide a pay-per-program structure such that the user is billed each time previously recorded content is sent to the user's DVR. The Service Provider 106 may alternatively provide a pay-per-program structure such that the user is billed each time previously recorded content is viewed.

When Service Provider 106, receives the request for previously broadcasted content, in one embodiment, the Service Provider 106 first performs a validation of the request to determine whether the user is authorized to receive the previously broadcasted content. For example, to accomplish this Service Provider 106 performs a query operation on Database 140 to retrieve Table 150. In one embodiment Table 150 contains N number of rows, each containing information for a particular DVR user. Table 150 may be comprised of columns representing a User ID field 152, a DVR field 154, a Subscription Type field 156 and Billing Information field 158 for N number of DVRs or DVR users. The User ID field 152 corresponds to a unique user ID for each user of a DVR. The user information may be a user name supplied to the Service Provider 106 when a DVR user registers and activates a DVR 101 with Service Provider 106. DVR field 154 represents the particular DVR associated with each user ID in 152. The DVR field may identify DVRs by a number unique to each DVR, such as a DVR serial number or MAC address. It should be noted that a particular user, User 2, for instance, may own more than one DVR. Thus, Table 150 indicates that DVRs 102 and 103 are owned by User 2.

In this particular example, Service Provider 106 receives a request from DVR 101 for previously broadcasted content. When Service Provider 106 queries Database 140, the returned information will indicate that DVR 101 is owned by User 1. Further, the information indicates that the subscription type 156 for DVR 101 is an unlimited subscription, such that DVR 101 is authorized to download an unlimited amount of previously broadcasted program content.

Suppose Service Provider 106 receives a request for previously broadcasted content from DVR 102. In this scenario, when Service Provider 106 queries Database 140, the data would indicate that the subscription type of DVR 102 is a pay per-view type subscription. Thus, every time DVR 102 receives previously broadcasted program content, Service Provider 106 enters a charge transaction for User 2 into Database 140 using the Billing Information provided in field 158. Alternatively, the charge transaction may be entered into a separate billing database dedicated to storing and processing fee transactions.

Additionally, the subscription type may indicate that a particular user has not subscribed to the channel, for instance, because it is a premium channel. Therefore, the Service Provider 106 can deny the request. Alternatively, the Service Provider 106 can present a DVR user with the opportunity to subscribe to the premium channel or to receive the previously recorded content for a fee.

At this point, Service Provider 106 may proceed to select one or more DVRs to create a DVR Pool as described in section 3.3. However, in another embodiment, content providers that originally provide the broadcasted content may provide rules for accessing previously broadcasted content. For instance, some content providers may not allow any previously broadcasted content to be sent to user's who did not record the broadcasted content. Thus, after validating the request for previously broadcasted content, Service Provider 106 may optionally determine from a content provider whether the requested program content is authorized for transfer.

Figure 1D:
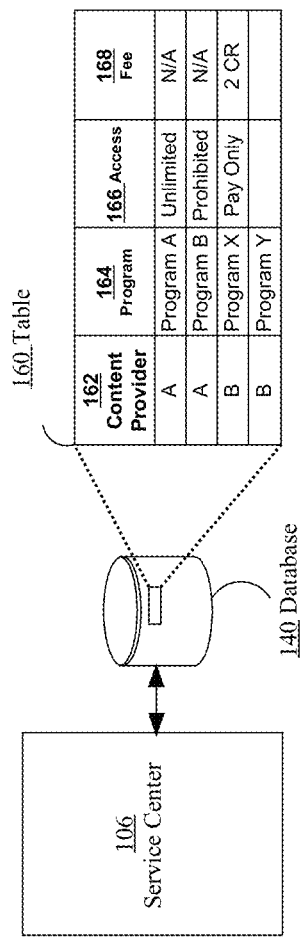
FIG. 1D is a block diagram illustrating a communication system for authorizing requests for previously broadcasted content according to one embodiment of the invention.

Referring to FIG. 1D, according to one optional embodiment, Database 140 contains data supplied from Content Provider 108. Table 160 represents the data supplied from a plurality of Content Providers. Service Provider 106 may obtain the data from Content Providers using a number of methods. For instance, Service Provider 106 may communicate directly with Content Provider 108 through Internet 107 to provide the data.

In this particular embodiment, Table 160 includes N number of rows, each containing 4 columns representing a Content Provider field 162, a Program field 164, an Access field 166 and a Fee field 168. The Content Provider field 162 represents the identification of the content provider. For instance, Content Provider A supplies programs different from Content Provider B. The Program field 164 represents a particular program supplied and/or broadcasted by a particular Content Provider. In this embodiment, Content Provider A broadcasts Programs A and B while Content Provider B broadcasts Programs X and Y. Further, the Access field 166 specifies specific access rules for each program. Access to a program may be Unlimited, such that anyone may retrieve the content at any time or Prohibited, such that the content is not available for retrieval. Further, a program may be classified as Pay only or pay-per-view, such that the program content is only available for retrieval for a fee.

Assume, for instance, that DVR 101 requests previously broadcasted Program A. In order to approve the request, Service Provider 106 queries Database 140 to obtain the information in Table 160. According to Table 160 Program A is classified as an unlimited access program. Therefore, Service Provider 106 approves the request and proceeds to initiate the transfer of Program A to DVR 101. In one embodiment, the Service Provider 106 can notify DVR 101 that the request has been approved.

However, assume that DVR 101 requests previously broadcasted Program B. According to Table 160, retrieval of Program B is prohibited. Therefore, Service Provider 106 denies the request and notifies DVR 101 that retrieval of Program B is now allowed.

Alternatively, if DVR 101 requests Program X, Service Provider 106 will determine that retrieval of Program X requires a fee. To determine the amount of the fee, in one embodiment, Service Provider 106 can examine the Fee field 168 of Table 160. Accordingly, the fee for program X is listed as 2 credits. When the Service Provider 106 determines that a fee is required to retrieve a program, the Service Provider 106 may send a message to DVR 101 indicating the same. When DVR 101 receives the message, DVR 101 causes a screen to be displayed to a user of DVR 101 requesting that payment be authorized. Alternatively, Service Provider 106 automatically authorizes the payment for Program X by querying Database 140 for billing information from Billing field 158 of Table 150.

3.3 Pool Selection

Once the Service Provider 106 determines the user is authorized to receive the content and that the content is available for transfer, the Service Provider 106 proceeds to form a pool of selected DVRs.

Figure 3:
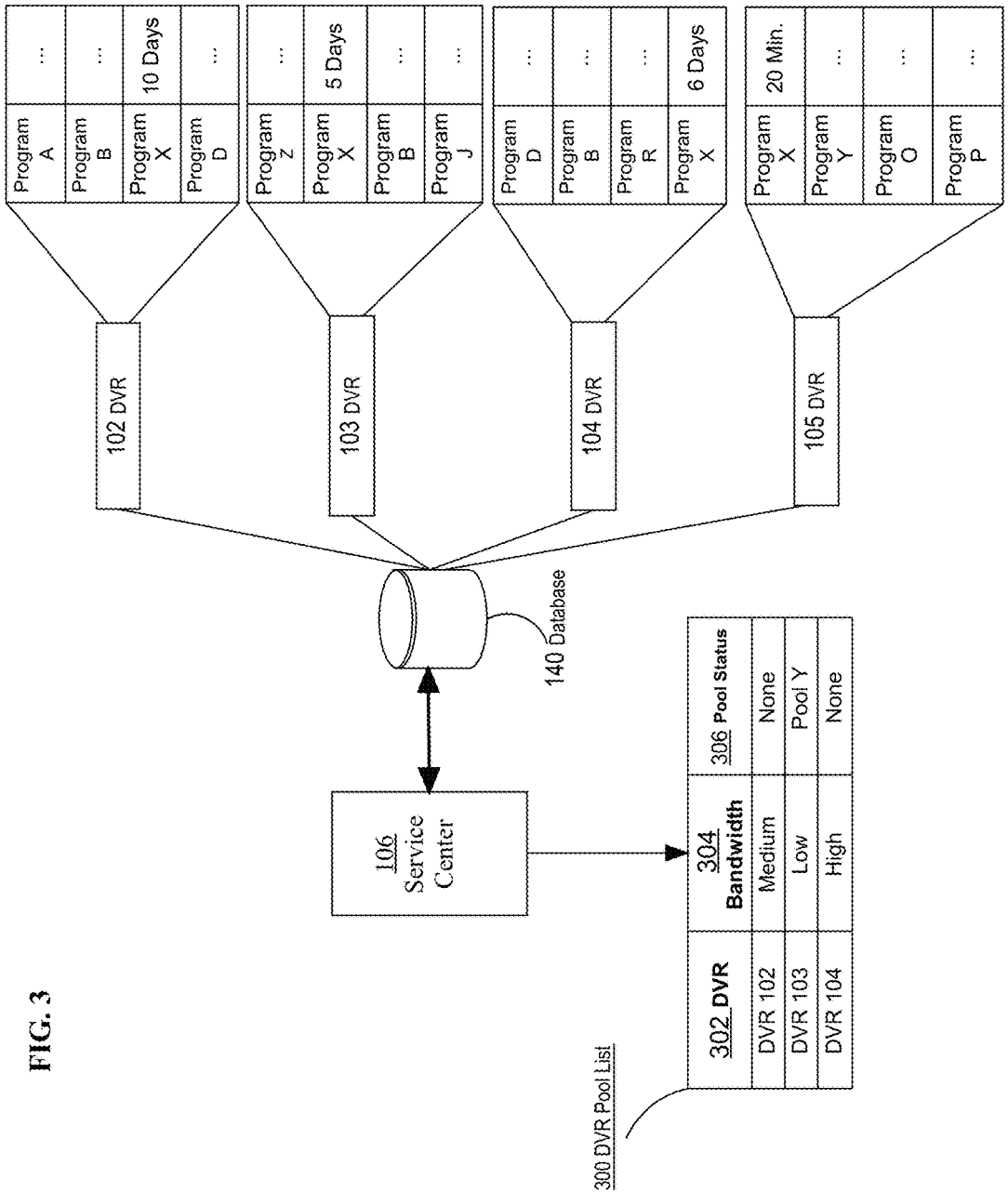
FIG. 3 is a block diagram illustrating a communication system for creation a pool of DVRs according to one embodiment of the present invention.

Referring to FIG. 3, according to one embodiment, each DVR 102-105 stores previously broadcasted content that it has recorded for a limited amount of time, typically because each DVR has differing memory demands and may have to delete old content to make room for new content. Periodically, each DVR 102-105 may supply a list of stored content, as well as the amount of time the content is expected to be stored, to Service Provider 106, which stores the information in Database 140. When Service Provider 106 receives and validates a request for a previously broadcasted program from DVR 101, Service Provider 106 queries Database 140 to determine which DVRs currently have the content available for transfer.

Assume, for instance, that DVR 101 requests previously broadcasted Program X. The Service Provider 106 receives the request and queries database 140 to retrieve Tables 310-313. In one embodiment, Tables 310-313 each contain N number of rows, each row corresponding to specific content stored on the storage device of a corresponding DVR. Each of Tables 310-313 can contain 2 columns, one column representing the title or identifier of the content, and the second column representing the amount of time left before the content is deleted from the storage device.

In one embodiment, Service Provider 106 determines that DVRs 102, 103 and 104 have recorded and stored Program X. Further, in another embodiment, Service Provider 106 determines that although DVR 105 has stored and recorded program X, it is scheduled to be deleted shortly. Therefore, Service Provider 106 initially selects DVRs 102, 103 and 104 for inclusion in DVR Pool list 300.

Further, Service Provider 106 can specify additional criteria for filtering DVRs for DVR Pool List 300. For instance, each DVR 102-105 may contain information identifying a bandwidth associated with the DVR. DVR Pool List 300 may contain a DVR field 302, a Bandwidth field 304, and a Pool Status field 306. In Bandwidth field 304, a high bandwidth indicates that DVR can transfer program content at a higher than average rate, a medium bandwidth indicates an average rate, and a low bandwidth indicates a lower than average rate. In one embodiment, Service Provider 106 can favor DVRs with higher bandwidth, such that any DVR with low bandwidth will be ejected from the DVR pool. According to DVR Pool List 300, DVR 103 has a low bandwidth; thus, in one embodiment, Service Provider 106 removes DVR 103 from the DVR Pool list 300. Alternatively, Service Provider 106 can decide to leave DVR 103 on the DVR Pool list 300 but favor DVRs 102 and 104 for transfers. Hence, DVR 103 can act as a back up DVR if any of DVRs 102 or 104 encounter an error in the transfer Additionally, the Service Provider can favor DVRs not already part of another DVR pool for transferring program content. For instance, according to Pool Status field 306, DVR 103 is already assigned to Pool Y. Therefore, Service Provider 106 can remove DVR 103 from the DVR Pool List 300 or give DVR 103 a lower priority for transfers in the current Pool list 300.

3.4 Initiating a Transfer of Previously Broadcasted Content

Once the Service Provider 106 has created a DVR pool for the particular request, the Service Provider 106 initiates a transfer between the DVR pool and the requesting DVR. To initiate a transfer between the DVR pool and the requesting DVR, the Service Provider 106 may communicate with each DVR 102-104 in the DVR Pool list 300 to request each DVR 102-104 to send the program content to the requesting DVR. In one embodiment, the requesting DVR is DVR 101. It should be noted, however, that DVR 101 may be a PC, a portable device such as a PDA or mobile phone, or any other device capable of receiving content from one or more DVRs.

Figure 4A:
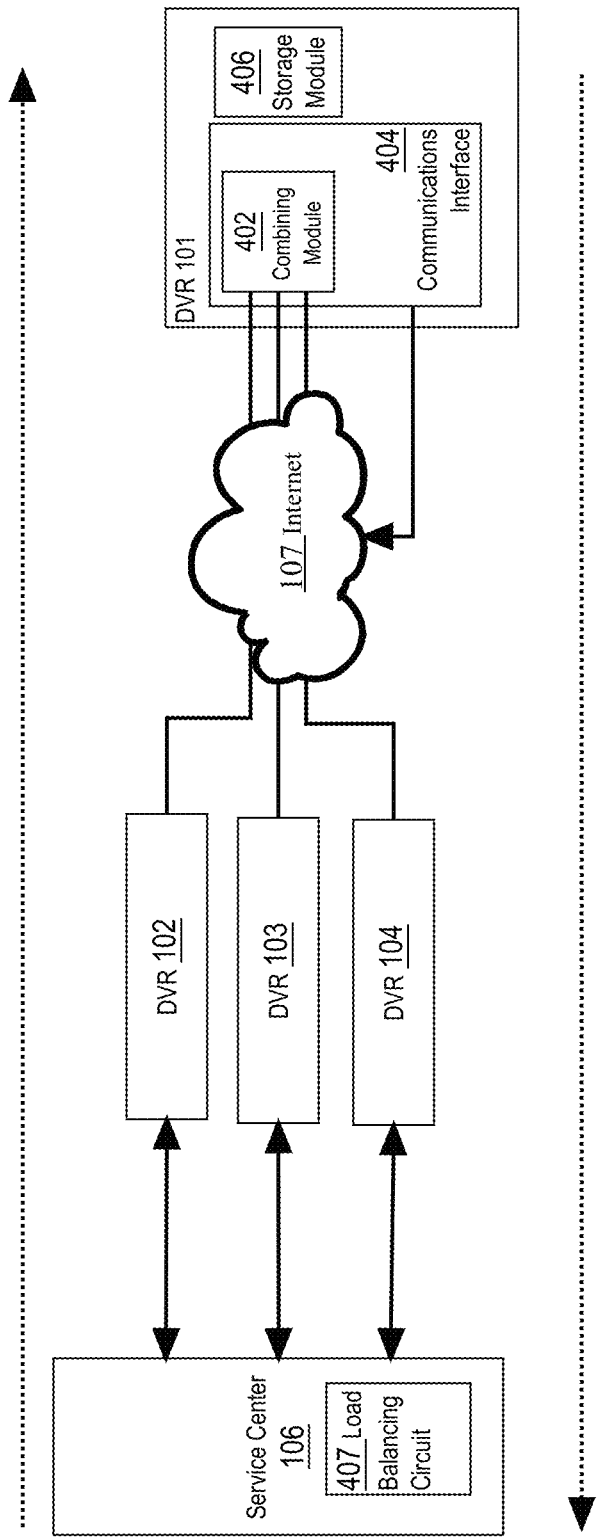
FIG. 4A is a block diagram illustrating a method for initiating a "push" transfer of previously broadcasted content according to one embodiment of the invention.

Referring to FIG. 4A, according to one embodiment, Service Provider 106 sends a transfer request to each DVR 102, 103 and 104 in the DVR Pool. This request instructs each DVR to transmit a portion of the previously broadcasted content to the requesting DVR 101. Alternatively, the request can instruct a particular DVR to send the full portion of the previously broadcasted content to the requesting DVR 101.

When each DVR 102, 103 and 104 receives the request, the DVRs initiate a transfer of the content through Internet 107 to DVR 101. In one embodiment, each DVR is designated a portion of the content to send. Referring to FIG. 5, according to one embodiment, the previously broadcasted content is divided into four portions A, B, C and D. Each of portions A, B, C and D contains sub-portions. For instance, portion A consists of sub portions A1, A2 and A3, portion B consists of sub portions B1, B2, and B3, portion C consists of sub portions C1 and C2 and portion D consists of sub portion D1.

In this manner, Service Provider 106 can instruct each DVR 102-104 in the DVR pool to transfer one or more portions or sub-portions. For instance, Service Provider 106 may instruct DVR 102 to transfer portion A, DVR 103 to transfer portion B, and DVR 104 to transfer portion C and D. In other embodiments, the program content can be divided into any number of portions which may be assigned to one or more DVRs. Further, each DVR may be assigned a plurality of portions to send. For instance, if Service Provider 106 determines that DVR 102 has a higher bandwidth than DVR 103 or 104, Service Provider 106 can instruct DVR 102 to send portions A and B.

In one embodiment, each DVR 102, 103 and 104 sends each program sub-portion in a content segment 502 in FIG. 5. Content segment 502 contains Content data 503 and Placement data 505. Further, each DVR in the DVR Pool may also encrypt the data of each content segment for secure transfer over Internet 107. In one embodiment, each DVR uses a Message Digest-5 (MD5) encryption of its MAC address. In other embodiments, each DVR may use any appropriate encryption method such as public key or Secure Hash Algorithm-1 (SHA-1) encryption.

Further, Service Provider 106 may include a load balancing circuit 407. The load balancing circuit 407 communicates with each DVR 102-104 in DVR pool to determine the optimal division of program portions and sub-portions among the DVRs for transfer. Thus, load balancing circuit 407 may dynamically adjust the distribution of the program content between DVRs 102, 103 and 104. For instance, if during transfer, DVR 102 goes offline or the bandwidth of DVR 102 becomes extremely low, load balancing circuit 207 can instruct either DVR 103 or 104 to transfer all or just the remaining portion of content assigned to DVR 102 for transfer. Hence, assuming that DVR 102 was originally assigned to transfer portion A to DVR 101, load balancing circuit 207 assigns any sub-portions of A that were not transferred to DVR 103, DVR 104, or both. Alternatively, load balancing circuit 207 can assign every sub-portion of A to DVR 103, DVR 104, or both, to ensure that no sub-portions are lost due to the failure of DVR 102.

When DVR 101 receives the sub-portions from each DVR 102, 103, and 104, it begins to piece the sub-portions of the content together using a combining module 402 on DVR 101. In combining module 402, portions A, B, C and D are assembled together as each sub-portion is received to create one stream of program data. In order to accomplish this, in one embodiment, combining module 402 reads the Placement Data 505 of Content Segment 502 to determine the correct placement of the portion in the overall program content. For instance, portion A may indicate it needs to be placed before portion C, and portion B2 before portion B3. Next, according to one embodiment, DVR 101 combines all the portions and sub-portions of the previously broadcasted program content 500 to create a digital data stream. The digital data stream is then placed in Storage Module 406 for storage and further playback.

Alternatively, DVR 101 can use the time stamps in the sub-portions to assemble the digital data stream.

When the program content is combined and stored, in one embodiment, DVR 101 may further use combining module 402 to perform an integrity check of the entire content. An integrity check ensures that DVR 101 has received the full program content free from error. Once DVR 101 has determined it has received the program content with no errors, DVR 101 can send a message to Service Provider 106 indicating that it has received the file. Alternatively, DVR 101 can send a message to each DVR 102, 103, and 104 in the DVR pool to indicate the same.

Further, each DVR 102, 103 and 104 in the DVR pool may contain a module for tracking the progress of each transfer. When each DVR has detected that it has completed transferring its portion, it sends a message to Service Provider 106 indicating the same. Thus, when Service Provider 106 has received messages from each DVR in the DVR pool indicating that the transfer is complete, Service Provider 106 logs the transfer in Database 140. At this point, if the previously broadcasted content required a fee for transfer, Service Provider 106 can complete the payment transaction by deducting the fee from the user's account and transferring the fee to the Service Provider's account. Alternatively, the Service Provider 106 can deduct its own fee before crediting a Content Provider's account.

Alternatively, DVR 101 can report to Service Provider 106 when the download has completed. To bypass a user hacking the DVR 101 to not report back the download completion, the DVR 101 can hide the content until the Service Provider 106 informs the DVR 101 hat it can release the content to the user. Service Provider 106 can complete the payment transaction before informing the DVR 101 that it can release the content.

Figure 4B:
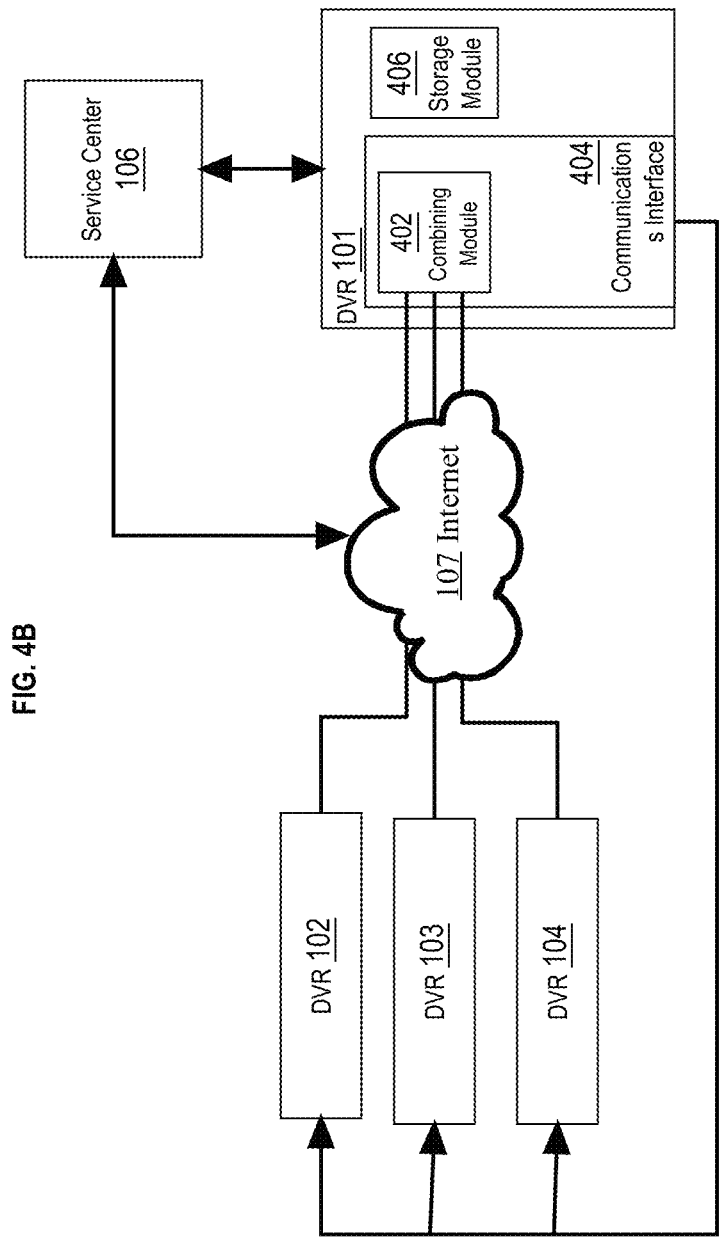
FIG. 4B is a block diagram illustration a method for initiating a "pull" transfer of previously broadcasted content according to one embodiment of the invention.

Referring to FIG. 4B, according to another embodiment, instead of sending a transfer request message to DVRs 102-104, Service Provider 106 can initiate a transfer by sending the transfer request message directly to DVR 101. When Service Provider 106 sends the transfer requests, it may also provide the DVR Pool list 300 to DVR 101. When DVR 101 receives the request, it determines which DVRs to contact by reading the DVR Pool list 300. In one embodiment, the DVR Pool List may contain the IP addresses of each DVR 102-104. Thus, using Communication Interface 404, DVR 101 initiates a transfer with each DVR 102-104 via Internet 107 using the corresponding IP addresses. Further, DVR 101 may indicate to each DVR 102-104 a portion of the program content 500 to transfer. Alternatively, when DVRs 102-104 receive the request from DVR 101, DVRs 102-104 can communicate with Service Provider 106 to determine which DVRs 102-104 are assigned which program content portions and sub-portions. Once DVRs 102-104 have determined which portions to send, DVRs 102-104 begin transferring the portions to DVR 101. At this point, the method for secure transfer of previously broadcasted content proceeds as discussed in reference to FIG. 4A.

4.0 Hardware Overview

Figure 6:
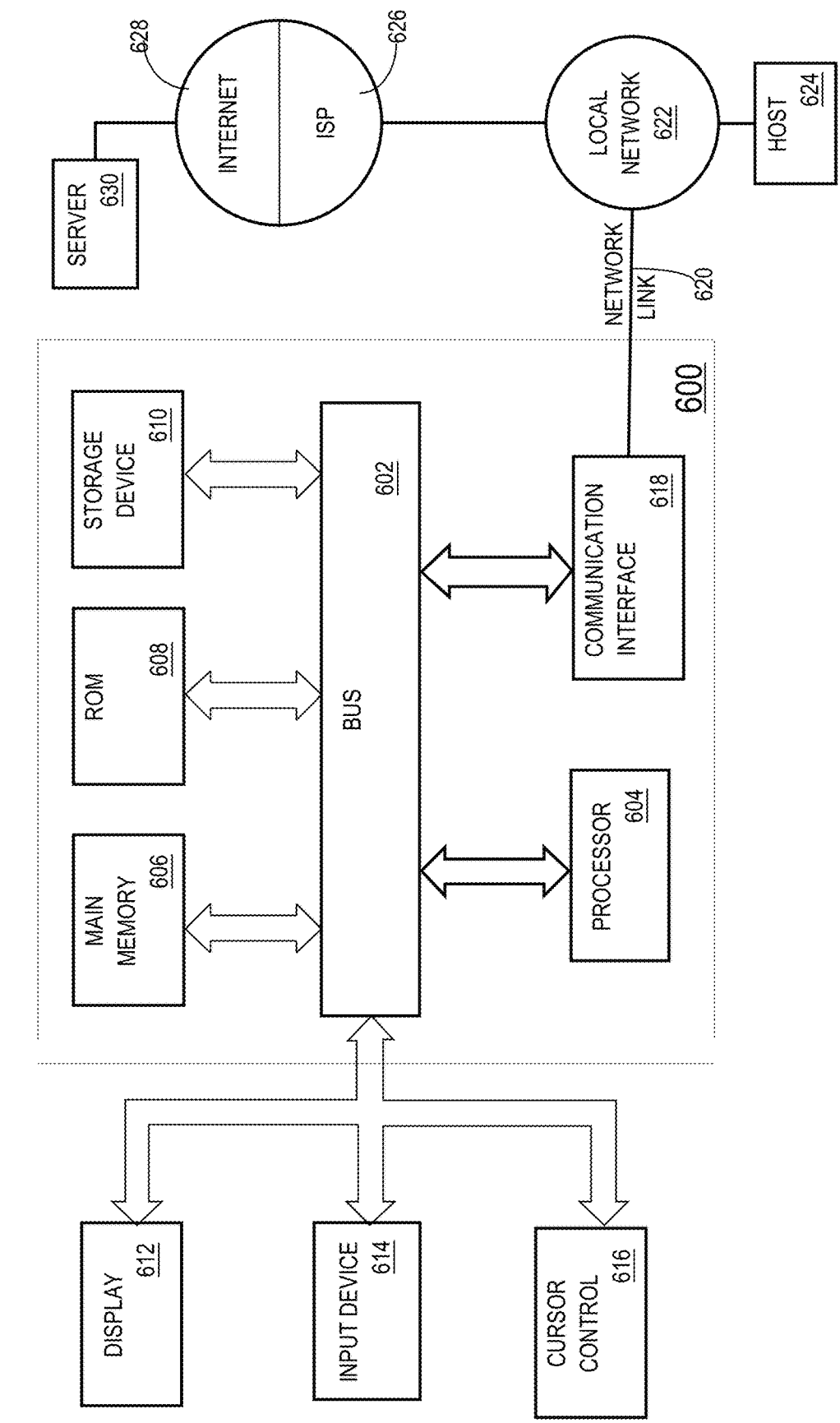
FIG. 6 is a block diagram of a system on which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    sending, by a server, to a remote device, a web page that includes a selectable list, the selectable list comprising previously broadcasted content;
    receiving, by the server, a selection of a particular previously broadcasted content from the selectable list;
    receiving, by the server from the media device, a request for delivery of the particular previously broadcasted content;
    generating a plurality of requests for a plurality of media devices, wherein each request of the plurality of requests comprises a command to transmit, to the media device, a corresponding portion of the particular previously broadcasted content;
    sending, from the server, to each of the plurality of media devices a corresponding request of the plurality of requests;
    causing, by the server, delivery of the plurality of portions of the particular previously broadcasted content from the plurality of media devices to the media device.

2. The method of claim 1, wherein the server determines whether the media device is authorized to receive the particular previously broadcasted content.

3. The method of claim 2, further comprising:
    sending, by the server, to the remote device, a web page that includes an estimated amount of time it will take for the media device to obtain the particular previously broadcasted content.

4. The method of claim 2, further comprising:
    sending, by the server, to the remote device, a web page that includes a number of media devices that have the particular previously broadcasted content stored.

5. A server, comprising:
    control circuitry, implemented at least partially in hardware, that:

sends to a remote device, a web page that includes a selectable list, the selectable list comprising previously broadcasted content;

receives a selection of a particular previously broadcasted content from the selectable list;

receives, from the media device, a request for delivery of the particular previously broadcasted content;

generates a plurality of requests for a plurality of media devices, wherein each request of the plurality of requests comprises a command to transmit, to the media device, a corresponding portion of the particular previously broadcasted content;

sends, to each of the plurality of media devices, a corresponding request of the plurality of requests;

causes delivery of the plurality of portions of the particular previously broadcasted content from the plurality of media devices to the media device, the media device storing the plurality of portions of the particular previously broadcasted content.

6. The server of claim 5, wherein the server determines whether the media device is authorized to receive the particular previously broadcasted content.

7. The server of claim 6, wherein the web page generator sends to the remote device, a web page that includes an estimated amount of time it will take for the media device to obtain the particular previously broadcasted content.

8. The server of claim 6, wherein the web page generator sends to the remote device, a web page that includes a number of media devices that have the particular previously broadcasted content stored.

9. One or more non-transitory computer-readable storage media, storing one or more sequences of instructions, which when executed by one or more processors cause performance of:

sending, by a server, to a remote device, a web page that includes a selectable list, the selectable list comprised of previously broadcasted programs;

receiving, by the server, a selection of a particular previously broadcasted content from the selectable list;

receiving, by the server from the media device, a request for delivery of the particular previously broadcasted content;

generating a plurality of requests for a plurality of media devices, wherein each request of the plurality of requests comprises a command to transmit, to the media device, a corresponding portion of the particular previously broadcasted content;

sending, from the server, to each of the plurality of media devices a corresponding request of the plurality of requests;

causing, by the server, delivery of the plurality of portions of the particular previously broadcasted content from the plurality of media devices to the media device, the media device storing the plurality of portions of the particular previously broadcasted content.

10. The one or more non-transitory computer-readable storage media of claim 9, wherein the server determines whether the media device is authorized to receive the particular previously broadcasted content.

11. The one or more non-transitory computer-readable storage media of claim 10, wherein the one or more sequences of instructions, which when executed by the one or more processors further cause performance of:

sending, by a server, to the remote device, a web page that includes an estimated amount of time it will take for the media device to obtain the particular previously broadcasted content.

12. The one or more non-transitory computer-readable storage media of claim 10, wherein the one or more sequences of instructions, which when executed by the one or more processors further cause performance of:

sending, by a server, to the remote device, a web page that includes a number of media devices that have the particular previously broadcasted content stored.

* * * * *